May 4, 1937. C. K. ROOS ET AL 2,079,565
MACHINE FOR MIXING PLASTIC MATERIAL
Original Filed June 8, 1925  4 Sheets—Sheet 3

Patented May 4, 1937

2,079,565

UNITED STATES PATENT OFFICE 2,079,565

MACHINE FOR MIXING PLASTIC MATERIAL

Carlisle K. Roos, Wheaton, Ill., and Murrell G. Allison, Southard, Okla., assignors to United States Gypsum Company, Chicago, Ill., a corporation of Illinois Application June 8, 1925, Serial No. 35,527
Renewed February 18, 1931

19 Claims. (Cl. 83—73)

This invention relates to plastic building materials and more particularly to a machine for mixing plastic material with a particular form of aggregate and water to produce a plastic mass to be formed into the desired article.

It is an object of this invention to provide a machine to carry out the processes and produce the articles particularly described and claimed in the prior applications of C. K. Roos, Serial No. 733,197, filed August 20, 1924, now U. S. Patent No. 2,017,022 and Serial No. 3,477, filed January 19, 1925, which include the formation of an aggregate by creating a fine grained dry foam of minute air bubbles and stabilizing the foam by reinforcing the walls of the bubbles, and then mixing the aggregate with the dry plastic material and water to form a plastic mass that may be molded or cast to produce a light weight porous article.

While the accompanying sheets of drawings illustrate a preferred form of machine and its application is described in carrying out a preferred form of process, it is to be understood that minor changes may be made in the machine and other ingredients may be acted upon by the machine to produce a cellular article of the character described without departing from the scope of this invention. Various ingredients for both forming the foam and stabilizing the bubbles to produce the aggregate are set out in the said applications above referred to and, from the nature of the cementitious materials with which this particular aggregate is mixed, it is obvious that materials other than calcined gypsum, as specified in the description of the operation of this machine herein, may be employed without departing from the scope of this invention.

Figure 1:
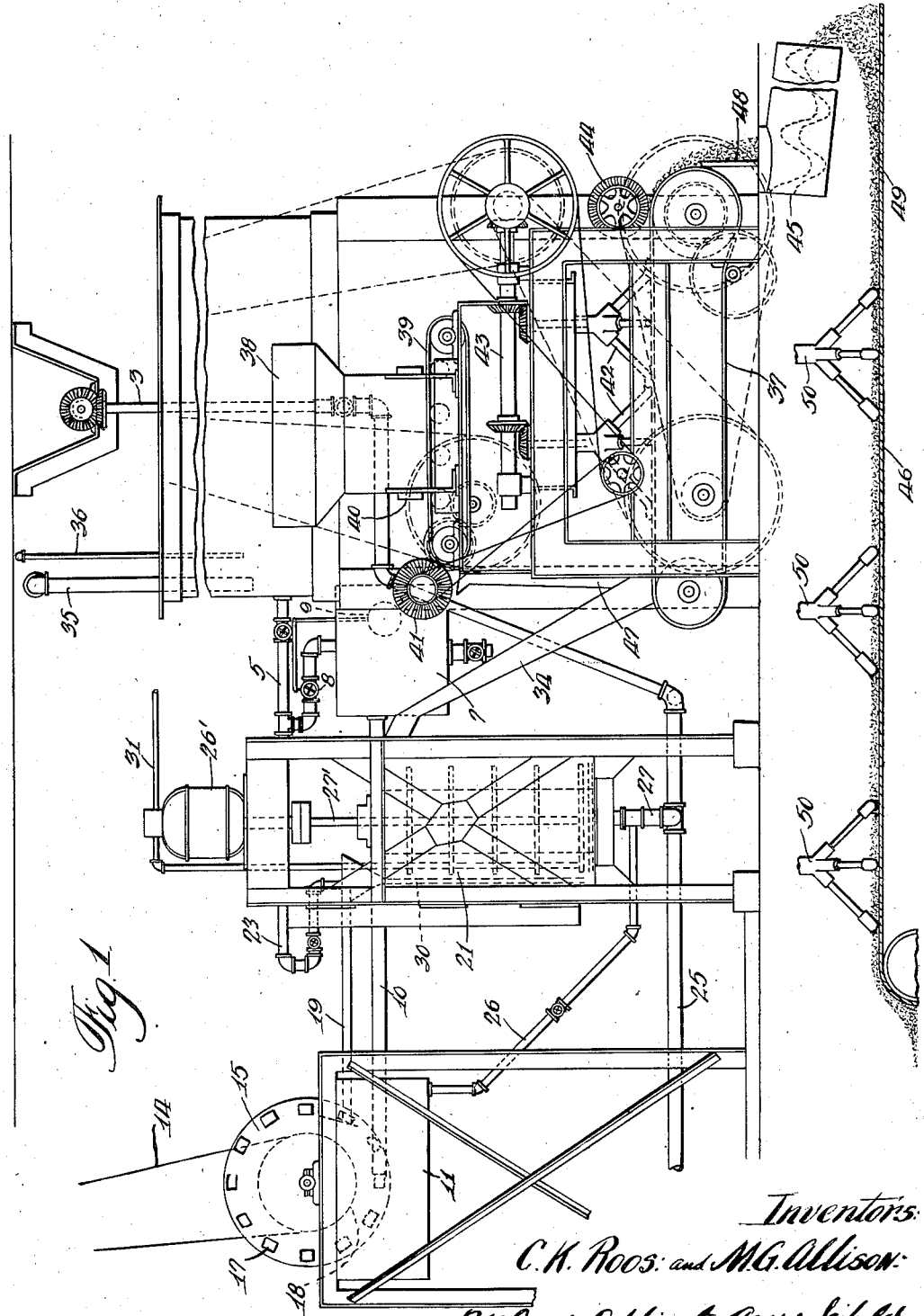
Figure 1 is view in side elevation, with parts broken away and parts in section, of a preferred form of machine complete as constructed in accordance with this invention.
Figure 2:
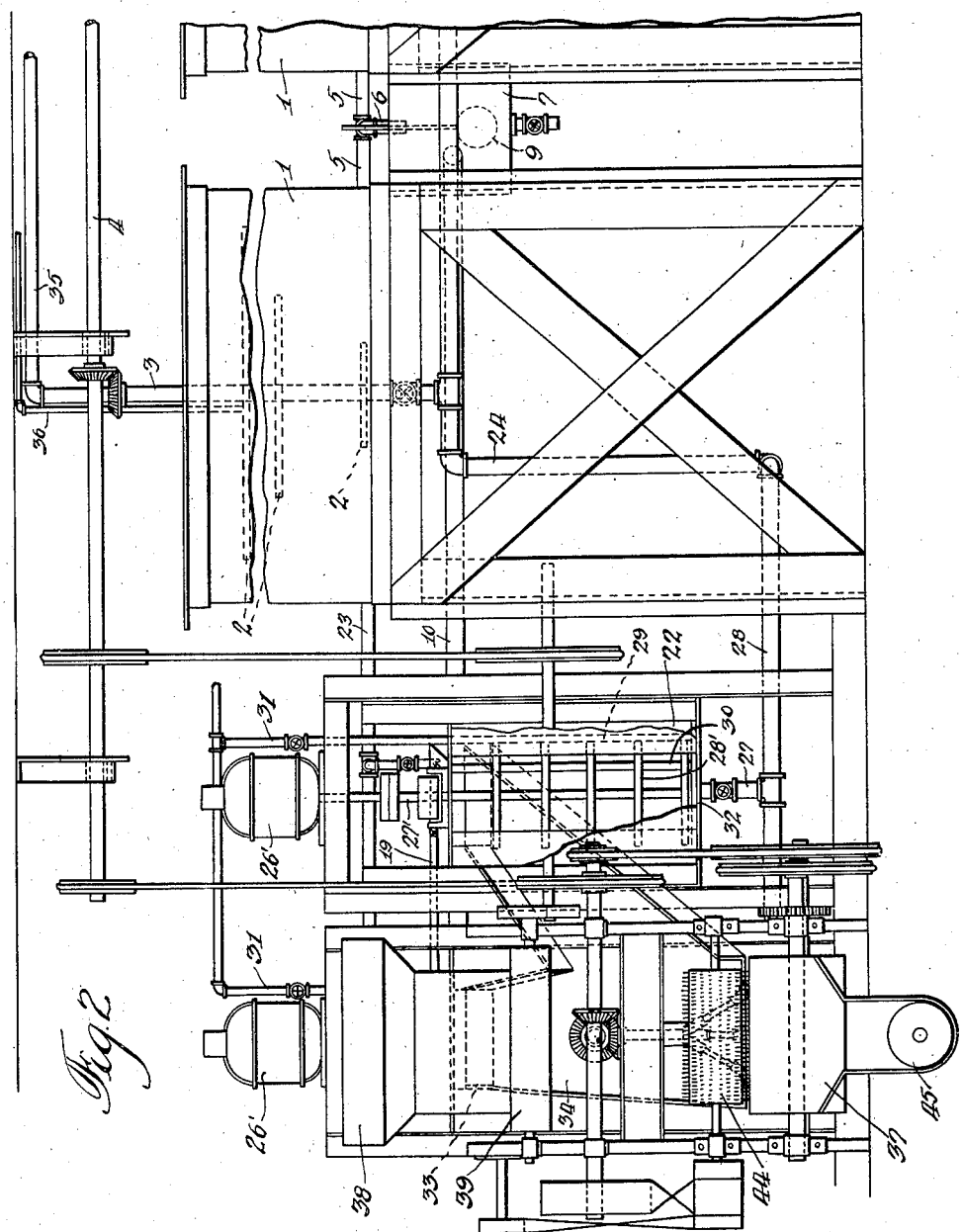
Figure 2 is a similar view in end elevation of Figure 1.
Figure 3:
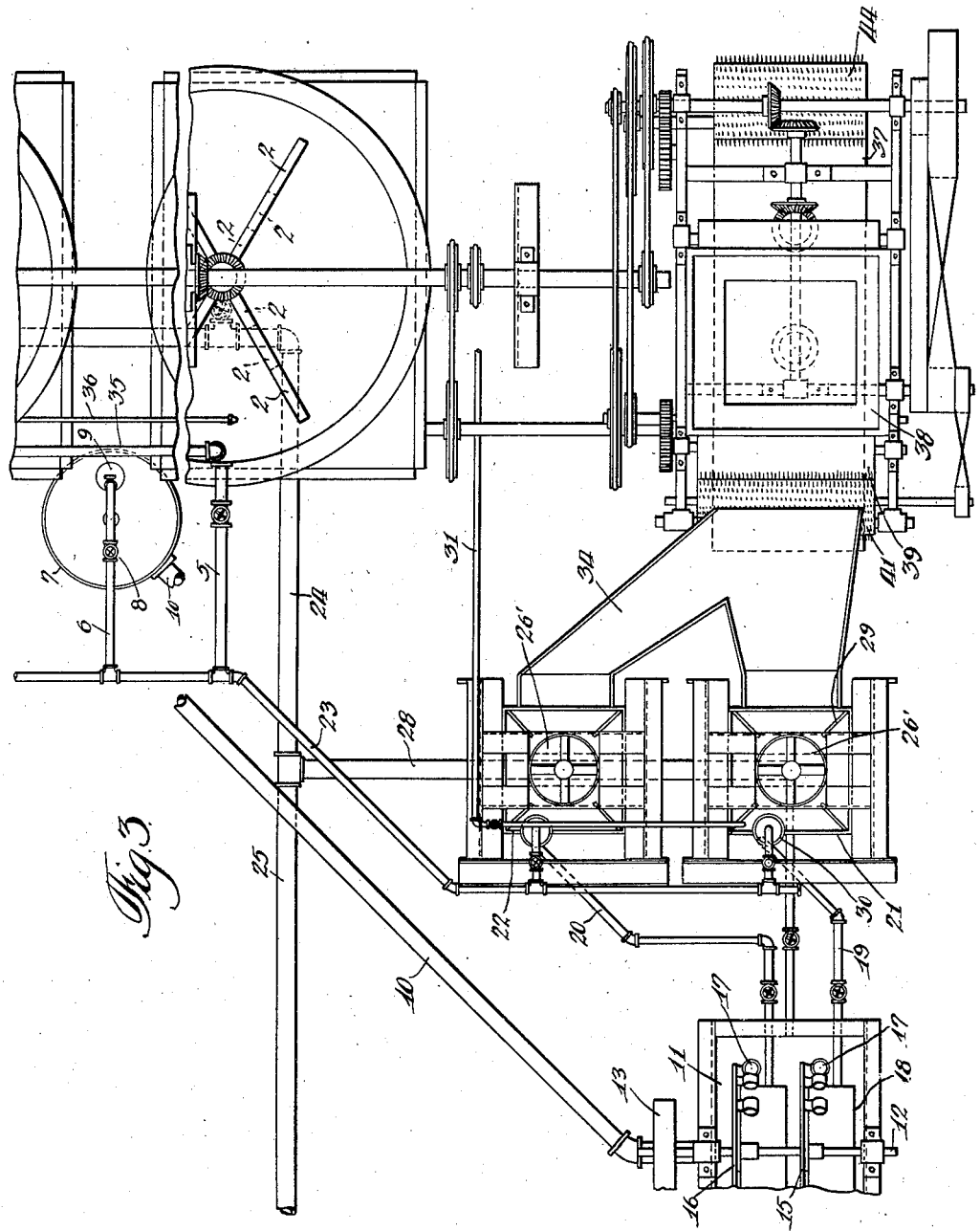
Figure 3 is a top plan view of Figure 1.

The preferred form of the machine constructed and operating in accordance with this invention, as illustrated upon the accompanying drawings, comprises two solution tanks 1 each provided with slowly moving agitators 2 on a vertical shaft 3 operated from an overhead power shaft 4. Tanks 1 are connected by pipes 5 which unite in a branch 6 emptying into a smaller tank 7 arranged at a lower line therebetween, the branch 6 having a valve 8 operated by a float 9 in said smaller tank 7. This latter tank 7 is connected by an inclined pipe 10 to a feeder tank 11 on which is mounted a rotating shaft 12, connected by a pulley 13 and belt 14 to an overhead shaft, not shown, which shaft carries two spaced apart discs 15 and 16, rotating within the feeder tank, each of which carries a plurality of small radial cups 17 facing in the same direction upon one side thereof near the periphery adapted to empty into drip pans 18 arranged thereunder. The drip pans are each connected by inclined pipes 19 and 20 to foam generator cells 21 and 22, respectively. The pipe 23 is an emergency solution feeder line from solution tank pipe 5 to the foam generator cells 21 and 22 and pipe 24 is a clean out drain for the tanks 1 to the main drain pipe 25, pipe 26 is a clean out drain from the feeder tank 11, and pipes 27 are clean out drains from foam generator cells 21 and 22 leading into branch 28 from the main drain pipe 25.

Each of the foam generator cells 21 and 22 is square in cross sections, as shown in Figure 1, and approximately twice as deep as their width. An electric motor 26' is preferably arranged above each cell which operates a central vertical impeller shaft 27', although any other source of power may be employed to rotate this shaft.

Each impeller shaft preferably carries five circular discs 28' of graduated diameters and are preferably unequally spaced from each other with the bottom disc notched.

Baffle plates 29 are arranged to extend throughout the length of each cell from each corner to close proximity of the rotating discs 28. A feeder pipe 30 is arranged in a corner of each cell discharging near the bottom thereof and provided at its upper end with a funnel into which pipes 19 and 20 empty. An air pipe 31, from a source of compressed air not shown, is provided with branches leading to the bottom of each cell terminating in a ring shaped air jet 32 below the impeller disc. The side of each cell is provided on the side adjacent the mixing device, hereinafter described, at the top thereof, with a discharge opening 33 leading to a chute 34 to said mixing device.

The solution tanks are preferably arranged in pairs, likewise the foam generating cells and the drip pans of the feeder tank, and are so connected by piping described which is provided with suitable valves as shown that normally but one is operated at a time but if any one of the solution tanks or foam generating cells or the smaller float valve tanks become out of order from any cause the other tank or cell or connection between the tank and cell could be readily connected without stopping the formation of the mixture. A solution pipe 35 and steam pipe 36 form a source of solution and are under pressure respectively, and as shown, are led into each solution tank which preferably discharges near the bottom thereof.

The foam mixing device is preferably located in line with the solution tanks 1 and in front of one of the foam generator cells. This device comprises an endless rubber belt 37 passing over pulleys at each end and driven through a train of belts and pulleys or chains and sprockets to the power shaft 4 overhead. A chute 34 from the foam generator cells 21 and 22 discharges upon the upper side of this belt near the end adjacent the generator cells. A bin is supported above an endless rubber belt 39 superimposed and parallel to the endless belt 37 which is caused to travel in an opposite direction thereto by a train of pulleys and belts driven from the main driving shaft, as shown. The bin is furnished with a gate 40 which allows the contents of the bin to be continuously drawn therefrom in a layer upon the belt. A cylindrical wire wheel 41 is arranged to brush the end of the superimposed belt 39 adjacent the foam generator cells and is caused to rotate by the belts and pulleys from the driving shaft, as shown. Two sets of slowly moving agitator fingers 42 are arranged to move about the upper surface of the lower belt 37 by gearing to the longitudinal shaft 43 which in turn is geared to one of the driving shafts connected to the main driving shaft 4, as shown. A cylindrical wire wheel 44 rotated by the driving mechanism is mounted to brush the top of the train belt adjacent the end furthermost from the generator cells directly above the upper end of a spiral conveyor 45 which in turn discharges upon a continuously moving mixer belt 46 having a plurality of slowly moving mixing fingers traveling about thereon, as illustrated in Figure 1.

This machine operates to mix the preferable ingredients in the following manner:

Water to which has been added one-half percent powdered soap bark is admitted into the solution tank 1 through overhead pipe 35 and is kept under constant agitation by the slowly moving agitators 2 or the one-half percent of soap bark solution may be formed by adding the soap bark to the water in the solution if desired. Further agitation may be caused when desired by admitting steam under pressure from pipe 36 which will rise from the bottom of tank up through the liquid. The solution is led through pipes 5 and 6 through float valve 8 into the smaller tank 7 where it is kept at a constant level by float 9. Thence this solution pours through pipe 10 into feeder tank 11 from which it is dipped by the rotating cups 17 in regular desired quantities and caught in the drip pan 18 from which it flows through pipe 19 into the foam generator cell 21.

The motor 26' rotates the impeller shaft 27' at as high a rate of speed as desired which with the five impeller discs, preferably decreasing in size and distance apart from bottom to top, and the fan baffle plates extending from the corners whips the solution admitted to the bottom of the cell through the feeder pipe 30, into a foam which mixes with the air from the circular air jet 32 and rises, under the beating action of the lower impeller and upward impact of the air jet, through and about the upper impeller which continues to stiffen and dry the foam structure until it emerges over the top of the opening 33 just above the upper impeller and discharges in a continuous stream by gravity down chute 33 and is spread to a uniform thickness on the rubber belt 37 of the foam mixer.

The foam reinforcing material of dry powdered form, preferably paste-powder, is placed in the bin 38 above the belt 39 and the gate 40 of the bin permits a layer of the paste-powder to be drawn continuously by the belt from the bin which layer is brushed off the end of the belt by the revolving wire wheel 41 in a uniform manner so as to drop down through the chute 47 forming a layer thereof, onto the layer of foam spread out on belt 37. As the belt 37 with its layer of foam dusted over with the reinforcing agent travels toward its discharge end the foam and powder is agitated by the two slowly moving sets of agitator fingers 42. Passing under the agitators which gently work the powdered substance and foam together the partly mixed foam then pours under the revolving cylindrical wire wheel 44 effecting a more complete assimilation of the powdered reinforcing material by the foam. The stationary scraper 48 completely removes the reinforced foam from the belt 37 dropping it down into the conveyor 45 for distribution or directly into the plastic mass of calcined gypsum 49 upon a conveyor belt discharging into a mould or plaster board machine passing under a series of slowly moving agitator fingers 50, such as illustrated in the C. W. Utzman Patent 1,330,413 of February 10, 1920, and with which the reinforced foam is incorporated to form a cellular structure within the plastic mass.

The tops of the solution tanks, smaller tank with float valve, feeder tank and drip pans are preferably open at the top as are also the foam generator cells and reinforcing material bin so that their contents are readily observable and for a like reason it is preferable to provide the top of the generator feed pipes with a funnel into which the solution from the feeder tank discharges. The motors operating the impeller shafts of the generator cells are independent of the other source of power so their speed may be regulated as desired, the other moving parts of the machine are synchronized and operated from the same source of power. The cups 17 dipping the solution from the feeder tank 11 are detachable so that the quantity of liquid dispensed by this means may be regulated and the air pipes leading to the solution tanks and generator cells are furnished with valves to control the supply of air thereto. As previously stated the ingredients for forming the foam solution as well as for use in a foam reinforcing material are not limited to those specified in the description of the operation of the machine illustrated herewith. With other ingredients other adjustments may be necessary and for that reason the speed of the impeller shaft, constant supply of solution and admission of air are preferably adjustable as shown and described, and likewise the speed of the moving parts of the machine.

Figure 4:
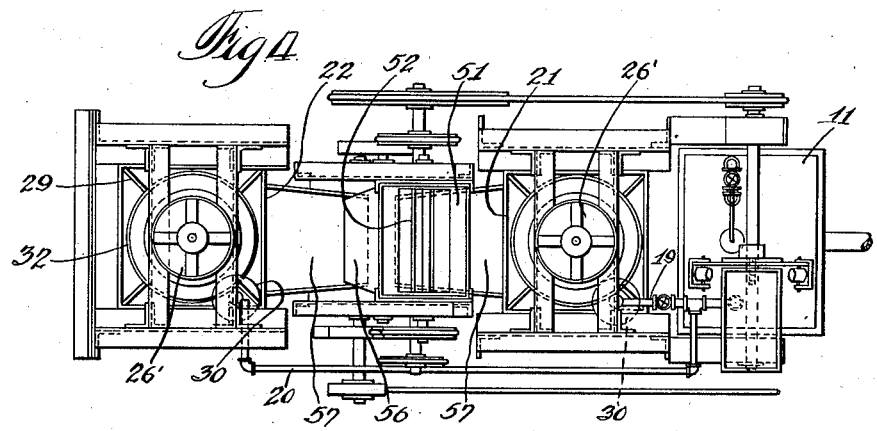
Figure 4 is a top floor view of a modified form of mixing device.
Figure 5:
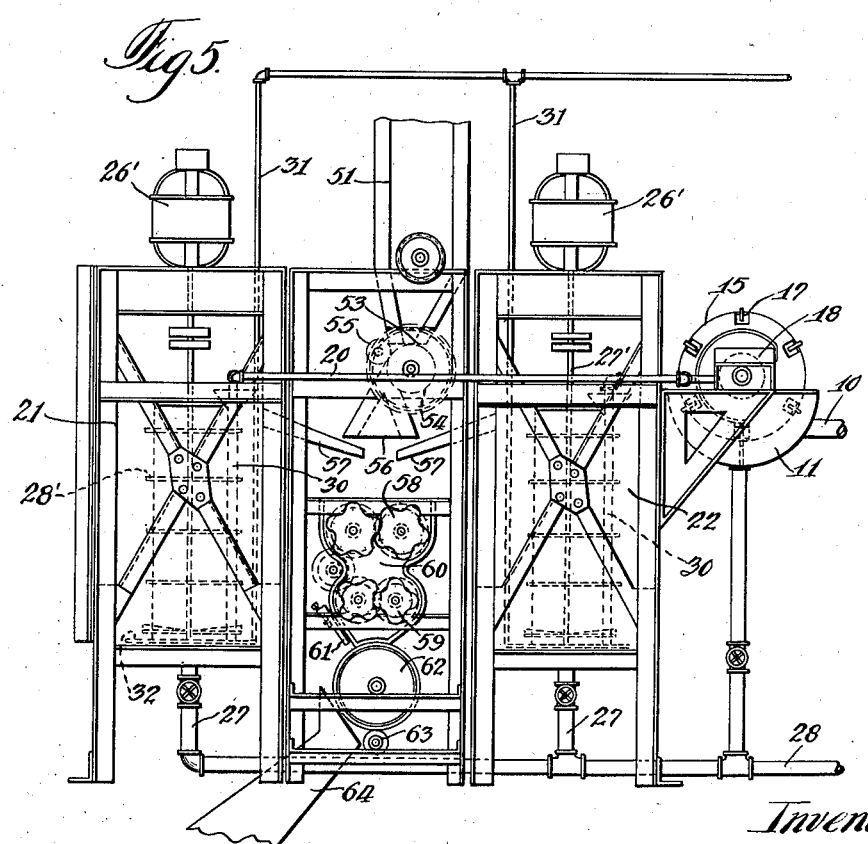
Figure 5 is a view inside elevation of Figure 4, with the pulleys and gear on that side removed.

In the modified form of foam mixing device illustrated in Figures 4 and 5, the construction of the foam cells is the same as described and the device for mixing the foam reinforcing material and the foam as it is discharged from the cells is arranged between the cells, as shown, also the feeder tank 11 is preferably arranged adjacent one cell.

In this type of foam mixer the reinforcing material in the form of a dry powder is placed in a bin 51 supported on a frame between the generator cells having a rotating agitator 52 therein to prevent arching of the material and converging opposite sides forming a discharge orifice 53 which with rollers 54 and 55 form a roller gate for delivering the powdered material down a two way spout 56 therebelow.

The generator cells discharge the foam onto spouts 57 leading from the adjacent cell walls and terminating under the spout 56, so that as the foam pours under the spout the powdered material will be dusted thereon. The foam and powder drop off the spout into a foam mixer which comprises two sets of intermeshing wire reels 58 and 59, one above the other, each revolving toward the centers of the casing 60 at approximately 85 R. P. M. The foam and dry reinforcing medium are sandwiched together in their passage through the reels and thoroughly mixed. A regulating slide gate 61 riding on roll 62, closing the bottom of the casing, controls the volume maintained within the mixing chamber casing 60 and also the size of the reinforced foam ribbon ejected from the bottom of the mixer onto the roll 62. A scraper roll 63 removes the reinforced foam from the large roll 62 dropping the mixture down the chute 64 from which it is discharged onto the plastic mass with which it is to be mixed.

What we claim is:

1. In a machine for making a fine grained aggregate of bubbles for plastic building materials comprising a solution tank, a feeding tank and a foam generator cell combined with a passage from the solution tank to the feeder tank and positive means for supplying the solution from the feeder tank in constant regular quantities to the generator cell.

2. In a machine for making a comminuted aggregate of bubbles for plastic building materials, the combination of a solution tank, a feeder tank and a foam generator cell with positive means of supplying solution from the solution tank through the feeder tank in constant regular quantities into the bottom of the generator cell, and means within the cell for beating the solution into a foam.

3. In a machine for making a fine grained aggregate of bubbles, a foam generating cell comprising a rectangular tank, an impeller shaft mounted thereon, means to rotate the impeller shaft, a plurality of impellers arranged in tiers upon the shaft and a baffle plate extending from top to bottom in each corner of the tank adjacent the impellers.

4. In a machine for making a fine grained aggregate of bubbles, a foam generating cell comprising a rectangular tank, an impeller shaft mounted therein, means to rotate the impeller shaft, a plurality of tiers of impellers upon the shaft and a baffle plate extending vertically from each corner of the tank to adjacent the impellers, a feed pipe discharging adjacent the bottom of the tank and an air jet upon the bottom of the tank below the lowermost impeller.

5. In a machine for making a fine grained aggregate of bubbles comprising a solution tank, a feeding tank and a foam generator cell combined with a passage from the solution tank to the feeder tank and means for supplying the solution from the feeder tank in constant regular quantities to the generator cell, the foam generator cell comprising a rectangular tank, an impeller shaft mounted therein, means to rotate the impeller shaft, a plurality of impellers arranged in tiers upon the shaft and a baffle plate extending vertically in each corner of the tank and terminating adjacent the impellers.

6. In a machine for making a fine grained aggregate of bubbles comprising a solution tank, a feeding tank having agitators moving therein, and a foam generator cell, combined with a passage from the solution tank to the feeder tank and means for supplying the solution from the feeder tank in constant regular quantities to the generator cell, the foam generating cell comprising a rectangular tank, an impeller shaft mounted therein, means to rotate the impeller shaft, a plurality of tiers of impellers upon the shaft and a baffle plate extending from top to bottom in each corner of the tank to adjacent the impellers, a feed pipe discharging adjacent the bottom of the tank and an air jet upon the bottom of the tank below the lowermost impeller.

7. In a machine for making a fine grained aggregate of film coated bubbles, means for producing a foam in combination with means for receiving the foam, of a source of stabilizing material superimposed above said receiving means, and means for dusting the stabilizing material upon the foam as it enters the said foam receiving means.

8. In a machine for making a fine grained aggregate of film coated bubbles, means for producing a foam in combination with means for receiving and discharging the foam, of a source of stabilizing material superimposed above said receiving means, means for dusting the stabilizing material upon the foam as it enters the said foam receiving means, and means for incorporating the stabilizing material and foam at the discharge end of the foam receiving means.

9. In a machine for making a fine grained aggregate of film coated bubbles, means for producing a foam in combination with a continuously moving endless mixing belt adapted to receive the foam, of a stabilizing material hopper superimposed upon an endless belt above said first belt, and means for brushing the stabilizing material from the latter belt to dust the foam upon the first belt.

10. In a machine for making a fine grained aggregate of film coated bubbles, means for producing a foam in combination with a continuously moving endless mixing belt adapted to receive the foam, of a stabilizing material hopper superimposed upon an endless belt above said first belt, means for brushing the stabilizing material from the latter belt to dust the foam upon the first belt, and slowly moving agitator fingers operating upon the first belt to unite the stabilizing material and foam together.

11. In a machine for making a fine grained aggregate of film coated bubbles, means for producing a foam in combination with a continuously moving endless mixing belt adapted to receive the foam, of a stabilizing material hopper superimposed upon an endless belt above said first belt and means for brushing the stabilizing material from the latter belt to dust the foam upon the first belt, slowly moving agitator fingers operating upon the first belt to unite the stabilizing material and foam together, and means to simultaneously effect a more complete assimilation of the stabilizing material of the foam and discharge the same from the foam mixing belt.

12. In a machine for making a fine grained aggregate of bubbles, a solution tank, a foam generating means, means for delivering solution from the solution tank to the cell in constant regular quantities, and means within the cell for whipping the solution into a foam in combination with a foam stabilizer comprising a source of powdered reinforcing material, means for dusting the powder upon a foam mixing belt, means directing the foam from the cell upon the mixing belt, means traveling on the mixing belt to incorporate the powdered material with the foam to reinforce the film walls of the bubbles of the foam and means for conveying the reinforced foam from the mixing belt.

13. In a machine for making a fine grained aggregate of bubbles, a solution tank, a foam generating means, means for delivering solution from the solution tank to the cell in constant regular quantities, and means within the cell for whipping the solution into a foam in combination with a foam stabilizer comprising a source of powdered reinforcing material, means for dusting the powder upon a foam mixing belt, means directing the foam from the cell upon the mixing belt, means traveling on the mixing belt to incorporate the powdered material with the foam to reinforce the film walls of the bubbles of the foam and means for conveying the reinforced foam from the mixing belt, an endless carrier for conveying a mass of plastic cementitious material to a forming device upon which the reinforced foam is discharged, and means moving over said endless carrier for intimately mixing the reinforced foam with the cementitious material.

14. A machine for making foam from a foaming solution which comprises a solution tank, a feeder tank, means for controlling the delivery of the solution from said solution tank to said feeder tank, a foam generator, means for delivering the solution in predetermined quantities from the feeder tank to the foam generator, means for delivering the foam from said generator to a conveyor, and means for withdrawing the foam from said conveyor for delivering it to a mixing machine.

15. A machine for making an aggregate for a plastic, cellular building material, comprising a solution tank, a foam generating element, positively operating means for supplying solution from said solution tank to said foam generating element in regulated quantities, a mixing element, and means for delivering foam from said generating element to said mixing element.

16. A machine for making a foam aggregate from a foaming solution and delivering the same to a mixing mechanism for manufacturing a plastic cellular building material which comprises a receptacle for the foaming solution, a foam generator, means for delivering the foam solution in predetermined quantities from the former to the latter, and means for delivering the foam aggregate from said generator to said mixing mechanism.

17. A machine for making a foam aggregate and mixing the same with a cementitious material for manufacturing a plastic cellular building material which comprises a foam solution receptacle, a foam generator, means for delivering the foam solution in predetermined quantities from the former to the latter wherein the foam aggregate is developed, and a mixing mechanism to which cementitious material and the said foam aggregate are delivered for intermixing them together to form a plastic cellular cementitious material.

18. A machine for making a foam aggregate and mixing the same with a cementitious material which comprises a foam solution tank, a foam generator, means for delivering the foam solution from the former to the latter wherein the foam aggregate is developed, a mixing mechanism, means for delivering the foam aggregate from said foam generator to said mixing mechanism, and means for delivering cementitious material to said mixing mechanism whereby the plastic cellular building material will be formed.

19. In an apparatus for continuously forming a comminuted foam, a container, means for supplying a foaming liquid thereto in regulated and controlled quantities, means to supply air to said container below the surface of said foaming liquid, and means for forming a circuitous flow of the foam in said container and transporting said foam actuated by the air supply means away from the foaming liquid.

CARLISLE K. ROOS.
MURRELL G. ALLISON.